United States Patent
Sun

(10) Patent No.: US 11,442,831 B2
(45) Date of Patent: Sep. 13, 2022

(54) METHOD, APPARATUS, DEVICE AND SYSTEM FOR CAPTURING TRACE OF NVME HARD DISC

(71) Applicant: ZHENGZHOU YUNHAI INFORMATION TECHNOLOGY CO., LTD., Zhengzhou (CN)

(72) Inventor: Yixin Sun, Zhengzhou (CN)

(73) Assignee: ZHENGZHOU YUNHAI INFORMATION TECHNOLOGY CO., LTD., Zhengzhou (CN)

( * ) Notice: Subject to any disclaimer, the term of this patent is extended or adjusted under 35 U.S.C. 154(b) by 76 days.

(21) Appl. No.: 17/275,827

(22) PCT Filed: Jun. 27, 2019

(86) PCT No.: PCT/CN2019/093360
§ 371 (c)(1),
(2) Date: Mar. 12, 2021

(87) PCT Pub. No.: WO2020/087956
PCT Pub. Date: May 7, 2020

(65) Prior Publication Data
US 2022/0043728 A1  Feb. 10, 2022

(30) Foreign Application Priority Data
Nov. 1, 2018 (CN) .......................... 201811295906.5

(51) Int. Cl.
*G06F 11/00* (2006.01)
*G06F 11/30* (2006.01)
(Continued)

(52) U.S. Cl.
CPC ...... *G06F 11/3034* (2013.01); *G06F 11/0772* (2013.01); *G06F 11/2205* (2013.01); *G06F 11/3466* (2013.01); *G06F 13/4221* (2013.01)

(58) Field of Classification Search
CPC ............. G06F 11/3466; G06F 11/2284; G06F 11/079; G06F 11/2205; G06F 11/3034
See application file for complete search history.

(56) References Cited

U.S. PATENT DOCUMENTS

| 9,768,952 | B1 * | 9/2017 | Allo | ........................ G06F 21/80 |
| 9,954,727 | B2 * | 4/2018 | Su | ........................ H04L 41/0686 |

(Continued)

FOREIGN PATENT DOCUMENTS

| CN | 106502814 A | 3/2017 |
| CN | 107122277 A | 9/2017 |
| CN | 109471763 A | 3/2019 |

OTHER PUBLICATIONS

International Search Report of the International Searching Authority for China National Intellectual Property Administration in PCT application No. PCT/CN2019/093360 dated Jun. 27, 2019, which is an international application corresponding to this U.S. application.

*Primary Examiner* — Charles Ehne
(74) *Attorney, Agent, or Firm* — Kolitch Romano LLP

(57) ABSTRACT

A system for capturing a trace of an NVME hard disc can include a BMC, a BIOS, a protocol analysis instrument, and a fixture plate comprising a processor and a dial switch. The BIOS is configured to acquire register error information of the PCIe link when an error occurs to a PCIe link where the NVME hard disc is located, and send the register error information to the BMC, and the BMC is configured to send the received information to the fixture plate, and the fixture plate is configured to trigger the protocol analysis instrument to capture a PCIe trace of the NVME hard disc when a current error type corresponding to the dial switch is consistent with the error type of the register error information parsed by a processor of the fixture plate.

13 Claims, 3 Drawing Sheets

(51) Int. Cl.
*G06F 11/07* (2006.01)
*G06F 11/22* (2006.01)
*G06F 11/34* (2006.01)
*G06F 13/42* (2006.01)

(56) References Cited

U.S. PATENT DOCUMENTS

| | | | |
|---|---|---|---|
| 10,896,113 B2* | 1/2021 | Cheng | G06F 11/326 |
| 2012/0096319 A1* | 4/2012 | Wang | G06F 11/2221 |
| | | | 714/45 |
| 2018/0300111 A1 | 10/2018 | Bhat et al. | |

* cited by examiner

METHOD, APPARATUS, DEVICE AND SYSTEM FOR CAPTURING TRACE OF NVME HARD DISC

CROSS REFERENCE TO RELATED APPLICATIONS

This application is a national phase application of International Application No. PCT/CN2019/093360, filed on Jun. 27, 2019 and entitled "METHOD, APPARATUS, DEVICE AND SYSTEM FOR CAPTURING TRACE OF NVME HARD DISC." This international application claims priority to Chinese patent Application No. 201811295906.5, filed on Nov. 1, 2018 and entitled "METHOD, APPARATUS, DEVICE AND SYSTEM FOR CAPTURING TRACE OF NVME HARD DISC." Both of these applications are hereby incorporated by reference in their entirety.

TECHNICAL FIELD

The embodiments of the disclosure relate to the technical field of server application, and in particular, to a method, apparatus, device and system for capturing a trace of an NVME hard disc and a computer-readable storage medium.

BACKGROUND OF THE INVENTION

The NVME (Non-Volatile Memory Express) hard disc is a type of hard disc with superior performance in the current server field. Its interface is based on PCIe (peripheral component interconnect express) Protocol and this type of hard disc has the characteristics of high interface rate and fast IO throughput. Due to the high performance of NVME hard disc, its requirements for server system compatibility in turn are relatively high.

Common NVME hard disc failures in the server system comprise uncorrectable fatal error, correctable non-fatal error and correctable error, etc. The symptoms are usually disc drop, downtime, speed reduction, etc. When testing the compatibility of NVME hard disc in the server system, it is often necessary to carry out long-term testing and debugging of various models to find out the reasons for the incompatibility between the NVME hard disc and the server system to ensure the availability of the server system.

When debugging the NVME hard disc, the related technology uses the trigger (trigger condition) function that comes with the PCIe protocol analysis instrument to capture the actual operating data of the interface protocol of the NVME hard disc (that is, capture the trace of the NVME hard disc) to analyze various incompatibility failures. For specific fault types, BIOS (Basic Input Output System) can be used to monitor PCIe error, parse specific faults, and then activate the external trigger of the protocol analysis instrument by using the GPIO (General Purpose Input Output) on the PCH (Platform Controller Hub) in a targeted manner. This method requires to customize the BIOS for different types of faults.

The types of the triggers provided by the protocol analysis instrument manufacturer is limited, and can only be triggered for several specific types of error, which cannot be well adapted to the complex errors that occur in the complex system of the server. Due to the fast transfer rate of the PCIe interface and the limited buffer capacity of the protocol analysis instrument itself, if BIOS cannot trigger for the specific error type effectively, it is often impossible to capture an effective PCIe trace for analysis. What's more, some faults are difficult to reproduce. Once these faults are missed, it will take a long time to wait for them, which will waste a lot of efforts and resources.

SUMMARY OF THE INVENTION

The embodiments of the present disclosure provide a method, apparatus, device and system for capturing a trace of an NVME hard disc, and a computer-readable storage medium, which can capture the failure error of the NVME hard disc corresponding to the PCIe trace precisely and efficiently without customizing the corresponding BIOS or trigger for different failure error types.

To solve the above technical problems, the embodiments of the present disclosure provide the following technical solutions.

According to an aspect of the present disclosure, a system for capturing a trace of an NVME hard disc is provided. The system comprises a BMC, a BIOS, a fixture plate and a protocol analysis instrument, wherein the BMC is connected with the fixture plate and the BIOS, respectively, and the fixture plate is connected with the protocol analysis instrument; wherein the BIOS is configured to acquire register error information of the PCIe link in which the NVME hard disc is located, and send the register error information to the BMC when an error occurs to the PCIe link; and the BMC is configured to send the received register error information to the fixture plate; and wherein the fixture plate comprises a processor and a dial switch, and is used to trigger the protocol analysis instrument to capture a PCIe trace of the NVME hard disc when the current error type corresponding to the dial switch is consistent with the error type of the register error information parsed by the processor.

In an embodiment, the GPIO pin of the fixture plate is connected with a trigger connector of the protocol analysis instrument. And triggering the protocol analysis instrument to capture a PCIe trace of the NVME hard disc comprises: setting the GPIO pin of the fixture plate so as to trigger the protocol analysis instrument to capture the PCIe trace of the NVME hard disc.

In an embodiment, an RS-232 serial port of the BMC on a server mainboard is connected to an input of the fixture plate through a cable, and the fixture plate is connected with the protocol analysis instrument through a coaxial cable.

In an embodiment, the BIOS is configured to send the register error information to the BMC via a KCS link.

According to another aspect of the present disclosure, a method for capturing a trace of an NVME hard disc is provided, which is applied to a fixture plate and comprises the following steps:

acquiring register error information, wherein the register error information is register information collected by a BIOS when an error occurs to a PCIe link in which the NVME hard disc is located;

parsing address information carried by the register error information to obtain a corresponding error type;

determining whether the error type is consistent with a current error type corresponding to a dial switch;

if the error type is consistent with the current error type corresponding to the dial switch, triggering a protocol analysis instrument to capture the PCIe trace of the NVME hard disc;

wherein the fixture plate is connected with the protocol analysis instrument, and the BIOS sends the register error information to the fixture plate through a BMC, and the address information of the register error information has a corresponding relationship with the error type.

In an embodiment, the GPIO pin of the fixture plate is connected with a trigger connector of the protocol analysis instrument. And triggering the protocol analysis instrument to capture a PCIe trace of the NVME hard disc comprises: sending instructions which set the GPIO pin of the fixture plate so as to trigger the protocol analysis instrument to capture the PCIe trace of the NVME hard disc.

In an embodiment, the BIOS sends the register error information to the BMC via a KCS link, and the BMC sends the received register error information to the fixture plate through an RS-232 serial port.

The embodiments of the disclosure also provide an apparatus for capturing a trace of an NVME hard disc, which is applied to a fixture plate and comprises:

- an information acquiring module for acquiring register error information, wherein the register error information is register information collected by a BIOS when an error occurs to a PCIe link in which the NVME hard disc is located; the register error information is sent to the fixture plate by the BIOS via a BMC; and the fixture plate is connected with a protocol analysis instrument;
- an error type parsing module for parsing address information carried by the register error information to obtain a corresponding error type; wherein the address information of the register error information has a corresponding relationship with the error type; an error type matching result judging module for judging whether the error type is consistent with the current error type corresponding to the dial switch;
- a triggering module for triggering a protocol analysis instrument to capture a PCIe trace of the NVME hard disc when the error type is consistent with the current error type corresponding to the dial switch.

The embodiments of the disclosure further provide a device for capturing a trace of an NVME hard disc. The device comprises a processor, wherein the processor is used to perform the steps of capturing a trace of an NVME hard disc according to any one of the preceding methods when the processor executes computer programs stored in a memory.

The embodiments of the disclosure further provide a computer-readable storage medium. The computer-readable storage medium is provided with programs for capturing a trace of an NVME hard disc, wherein the programs when executed by a processor causes the processor to perform the steps for capturing a trace of an NVME hard disc according to any one of the preceding methods.

The embodiments of the disclosure further provide a system for capturing a trace of an NVME hard disc. The system comprises a BMC, a BIOS, a protocol analysis instrument and a fixture plate comprising a processor and a dial switch. When an error occurs to a PCIe link where the NVME hard disc is located, the BIOS acquires register error information of the PCIe link, and sends same to the BMC, and then the BMC sends the received information to the fixture plate, and the fixture plate triggers the protocol analysis instrument to capture a PCIe trace of the NVME hard disc when the current error type corresponding to the dial switch is consistent with the error type of the register error information parsed by the processor.

The embodiments provided by the disclosure have the advantages that: the PCIe trace of an NVME hard disc can be captured precisely and efficiently since the operation state information of the PCIe link where the NVME hard disc is located is monitored by using the BIOS, and the register error information is captured in time when a fault occurs, and the processor of the fixture plate is used for parsing the error type of the register information, and the capture of the trace of an NVME is triggered on the basis of the comparison between the error type of the register information and the error type selected by the dial switch. Thus, the problem that the corresponding BIOS or trigger needs to be customized for different error types is solved, and the user can freely select the error types needed to be captured by using the dial switch to capture the corresponding PCIe trace for analysis. The method is beneficial to efficiently and precisely finding out the reason for the incompatibility between the NVME hard disc and the server system.

In addition, the embodiments of the disclosure also provide a corresponding apparatus, device and a computer-readable storage medium for the method for capturing a trace of an NVME hard disc, so that the method becomes more practical. The apparatus, device and a computer-readable storage medium have the corresponding advantages to those of the method.

It is to be understood that the foregoing general description and the following detailed description are exemplary only and are not intended to limit the invention.

BRIEF DESCRIPTION OF THE DRAWINGS

In order to explain the embodiments of the present invention or the technical solutions of the prior art more clearly, the following will briefly describe the figures that need to be used in the description of the embodiments or the prior art. Obviously, the following description about figures only refers some of the embodiments of the present invention, and for those skilled in the art, other embodiments may be obtained based on these drawings without creative efforts.

DETAILED DESCRIPTION OF THE PREFERRED EMBODIMENTS

In order to enable those skilled in the art to better understand the solution of the disclosure, the disclosure will be further described in detail below with reference to the figures and specific embodiments. Obviously, the described embodiments are only a part of the embodiments of the invention, rather than all the embodiments. Based on the embodiments of the disclosure, other embodiments which can be obtained by those skilled in the art without creative efforts shall also fall within the protection scope of the invention.

The terms "first", "second", "third", "fourth", etc. in the description, claims and the figures of this invention are used to distinguish different objects, not to describe a specific sequence. In addition, the terms "comprising" and "including" and any variations of them are intended to cover non-exclusive inclusion. For example, a process, method, system, product, or device that comprises a series of steps or units is not limited to the listed steps or units, but may comprise unlisted steps or units.

After introducing the technical solutions of the embodiments of the invention, various non-limiting embodiments of the invention are described in detail below.

Figure 1:
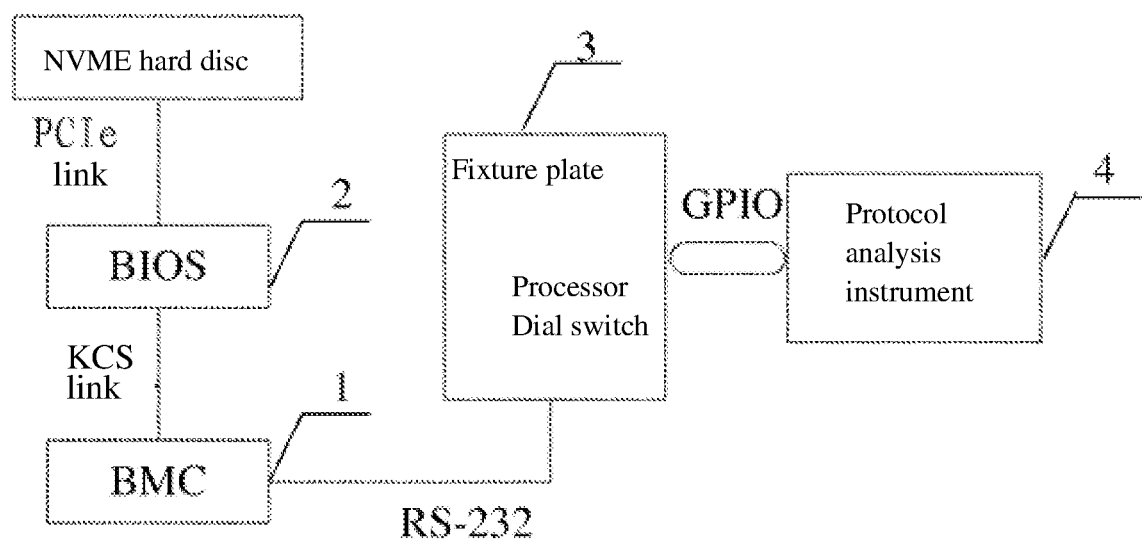
FIG. 1 is a schematic diagram of the architecture of a system for capturing a trace of an NVME hard disc according to an exemplary embodiment of the present disclosure.

Initially referring to FIG. 1, a schematic diagram of the architecture of a system for capturing a trace of an NVME hard disc according to an exemplary embodiment of the present disclosure is provided. This embodiment comprises: the system for capturing a trace of an NVME hard disc comprise a Baseboard Management Controller (BMC) 1, a BIOS 2, a fixture plate 3 and a protocol analysis instrument 4.

The BMC 1 is connected with the fixture plate 3 and the BIOS 2, respectively. The fixture plate 3 is connected with the protocol analysis instrument 4, and the BIOS 2 is connected with the NVME hard disc.

The BMC 1 and the BIOS 2 are both located on a server mainboard. Optionally, the BIOS 2 can communicate with the BMC 1 through a KCS link.

Optionally, the RS-232 serial port of the BMC 1 on the server mainboard is connected to an input of the fixture plate 3 through a cable. And the fixture plate 3 has a GPIO pin as an output. The fixture plate 3 is connected with a trigger connector of the protocol analysis instrument through a coaxial cable.

The BIOS 2 monitors a PCIe link connected with the NVME hard disc in real time, acquires/collect register error information of the PCIe link when an error occurs in the PCIe link in which the NVME hard disc is located (i.e., a PCIe error is reported in the related link), and sends the register error information to the BMC 1 through the KSC link. The implementation process that the BIOS 2 detects the error in the PCIe link and acquires the register error information of the PCIe link can refer to the related art. No further details will be given herein.

After the BMC 1 receives the information sent by the BIOS 2, the received register error information can be sent to the fixture plate 3 through a serial port (RS-232).

The fixture plate 3 comprises a processor and a dial switch, wherein each position of the dial switch corresponds to a type of the register error, such as unsupported request, bad TLP, bad DLLP, malformed TLP, and the like. The user can select one or more register error types which need to be triggered at the same time through the dial switch. That is, the user can select a test option which is incompatible between the NVME hard disc and the server system through the dial switch.

The processor of the fixture plate 3 can parse the received register error information to obtain the corresponding error type. The processor can parse the address information carried in the register error information to obtain the error type, and the address information carried in the register error information can be a self-defined address, and the address information and the error type have a unique correspondence. It should be noted that the address information here is different from the address in the configuration space. The address information carried by the register error information is a self-defined address. For example, when the carried address is 11122, the type of the register error information corresponding to the address is A, and when the carried address is 11221, the type of the register error information corresponding to the address is B.

When the current corresponding error type of the dial switch is consistent with the error type of register error information parsed by the processor, the processor triggers protocol analysis instrument 4 to capture the PCIe trace of the NVME hard disc. For example, the processor can trigger the capture of the trace by controlling the set of the output terminal pin.

For example, when the GPIO (General Purpose Input/Output) pin of the fixture plate 3 is connected with the trigger connector of the protocol analysis instrument 4, the capture of the PCIe trace of the NVME hard disc by the protocol analysis instrument 4 can be triggered by setting the GPIO pin of the fixture plate 3.

In this embodiment of the disclosure, the PCIe trace of an NVME hard disc can be captured precisely and efficiently since the operation state information of the PCIe link in which the NVME hard disc is located is monitored by using the BIOS, and the register error information is captured in time when a fault occurs, and the processor of the fixture plate is used for parsing the type of the register error information, and the capture of the trace of an NVME is triggered on the basis of the comparison between the type of the register error information and the error type selected by the dial switch. Thus, the problem that the corresponding BIOS or trigger needs to be customized for different error types is solved, and the user can freely select the error types needed to be captured by using the dial switch to capture the corresponding PCIe trace for analysis. The method is beneficial to efficiently and accurately finding the reason for the incompatibility between the NVME hard disc and the server system.

Figure 2:
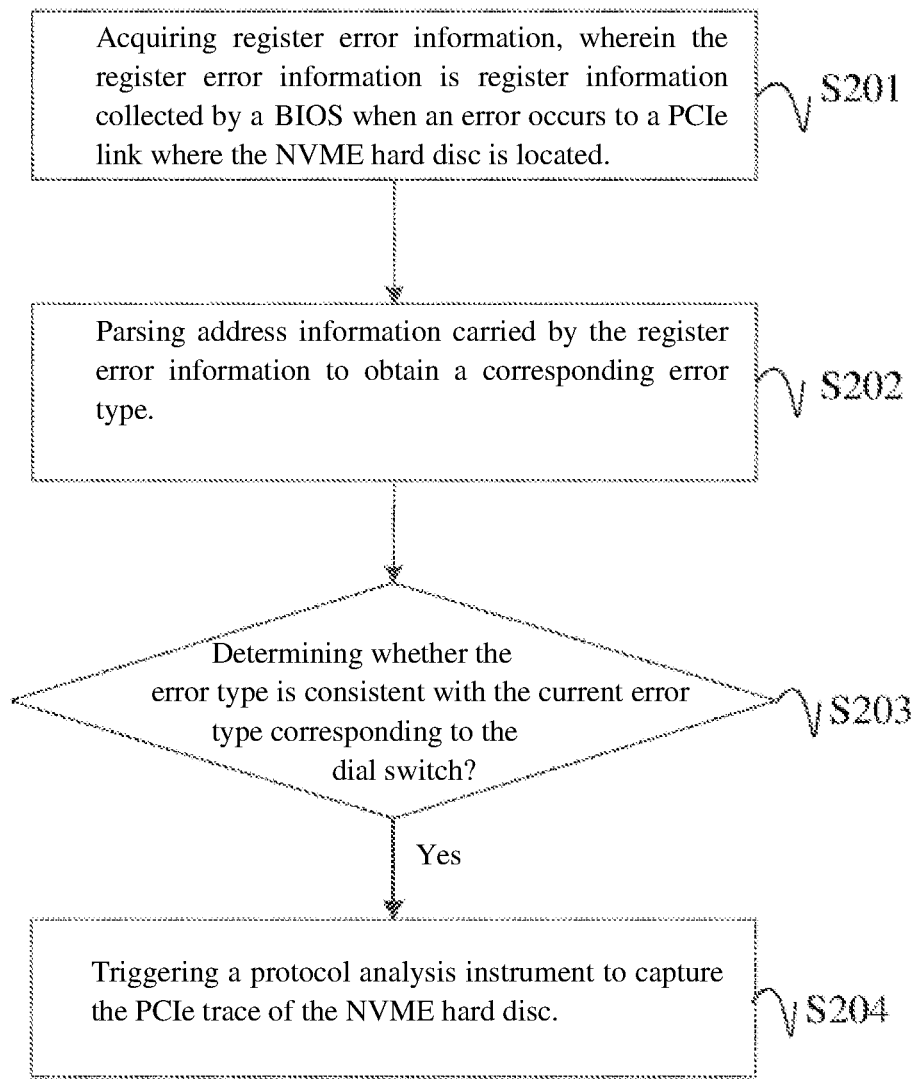
FIG. 2 is a flowchart of a method for capturing a trace of an NVME hard disc according to an embodiment of the present disclosure.

With reference to FIG. 2, FIG. 2 shows a flowchart of a method for capturing a trace of an NVME hard disc according to an embodiment of the present disclosure. For example, the method can be used in the fixture plate of the above-described embodiment. The method in this embodiment comprise the following steps:

S201: acquiring register error information, wherein the register error information is register information collected by a BIOS when an error occurs in a PCIe link in which the NVME hard disc is located.

S202: parsing the address information carried by the register error information to obtain a corresponding error type. The address information of the register error information has a corresponding relationship with the error type.

S203: determining whether the error type is consistent with an error type currently present in the dial switch. If it is yes, proceed to step S204.

S204: triggering the protocol analysis instrument to capture a PCIe trace of the NVME hard disc.

The fixture plate is connected with the protocol analysis instrument. The BIOS sends the register error information to the fixture plate through a BMC. The BIOS sends the register error information to BCM via a KCS link. And the BMC sends the received register error information to the fixture plate through a RS-232 serial port.

Alternatively, the GPIO pin of the fixture plate is connected with the trigger connector of the protocol analysis instrument. And the step of S204 can be embodied as instructions to send the set GPIO pin so as to trigger the protocol analysis instrument to capture the PCIe trace of the NVME hard disc.

As can be seen from the above, the embodiments of the present disclosure does not need to customize the corresponding BIOS or trigger for different error types, and the PCIe trace corresponding to the NVME hard disc error can be precisely and effectively captured.

The embodiments of the present disclosure also provide an apparatus for capturing a trace of an NVME hard disc, which makes the method more practical. The apparatus for capturing a trace of an NVME hard disc provided by the embodiments of the present disclosure is described. The apparatus for capturing a trace of an NVME hard disc and the method for capturing a trace of an NVME hard disc described above can be referenced to each other.

Figure 3:
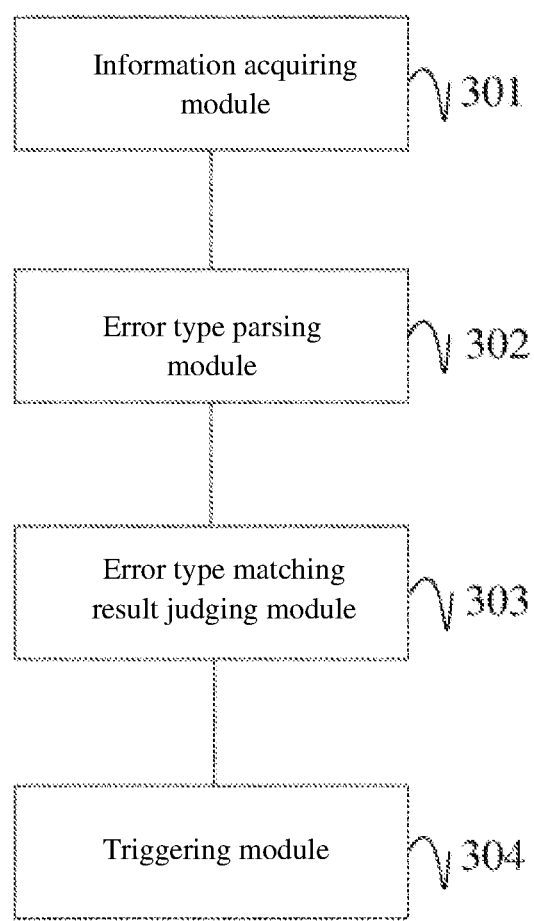
FIG. 3 is a schematic diagram of the structure of an apparatus for capturing a trace of an NVME hard disc according to an embodiment of the present disclosure.

With reference to FIG. 3, FIG. 3 shows a schematic diagram of the structure of an apparatus for capturing a trace of an NVME hard disc according to an embodiment of the present disclosure. The apparatus may comprise:

- an information acquiring module 301 configured to acquire register error information, wherein the register error information is register information collected by a BIOS when an error occurs in a PCIe link in which the NVME hard disc is located or to which the NVME hard disc is connected; the register error information is sent to the fixture plate by the BIOS via a BMC; and the fixture plate is connected with a protocol analysis instrument;
- an error type parsing module 302 configured to parse the address information carried by the register error information to obtain a corresponding error type; wherein the address information of the register error information has a corresponding relationship with the error type;
- an error type matching result judging module 303 for judging whether the error type is consistent with the current error type corresponding to the dial switch;
- a triggering module 304 configured to trigger a protocol analysis instrument to capture a PCIe trace of the NVME hard disc when the error type is consistent with the current error type corresponding to the dial switch.

Alternatively, in some embodiments of the disclosure, the trigger module 304 may also be configured to send instructions to set GPIO pin to trigger the protocol analysis instrument to capture a PCIe trace of the NVME hard disc when the GPIO pin of the fixture plate is connected with the trigger connector of the protocol analysis instrument.

The functions of the modules of the apparatus for capturing a trace of an NVME hard disc according to the embodiment of the present disclosure can be implemented according to the method in the above embodiments. And the specific implementation process can be described with reference to the related description of the method of the above embodiments. No more details will be further described herein.

As can be seen from the above, the embodiments of the present disclosure do not need to customize the corresponding BIOS or trigger for different error types, and the PCIe trace corresponding to the NVME hard disc error can be precisely and effectively captured.

The embodiments of the disclosure further provide a device for capturing a trace of an NVME hard disc, the device comprises:

a memory for storing computer programs;
a processor for executing computer programs to perform the steps of capturing a trace of an NVME hard disc according to any one embodiment of the present disclosure.

The functions of the modules of the device for capturing a trace of an NVME hard disc according to the embodiment of the present disclosure can be implemented according to the method in the above embodiments. And the specific implementation process can be described with reference to the related description of the method of the above embodiments. No more details will be further described herein.

As can be seen from the above, the embodiments of the present disclosure do not need to customize the corresponding BIOS or trigger for different error types, and the PCIe trace corresponding to the NVME hard disc error can be accurately and effectively captured.

The embodiments of the present disclosure also provide a computer-readable storage medium storing programs for capturing a trace of an NVME hard disc, wherein the programs when executed by a processor causes the processor to perform the steps of the method for capturing a trace of an NVME hard disc according to any one of the preceding methods.

The functions of the modules of the computer-readable storage medium for capturing a trace of an NVME hard disc according to the embodiment of the present disclosure can be implemented according to the method in the above embodiments. And the specific implementation process can be described with reference to the related description of the method of the above embodiments. No more details will be further described herein.

As can be seen from the above, the embodiments of the present disclosure do not need to customize the corresponding BIOS or trigger for different error types, and the PCIe trace corresponding to the NVME hard disc error can be precisely and effectively captured.

Various embodiments of the present invention are described progressively, each embodiment focuses on the differences from other embodiments, and the same and similar parts of these embodiments may refer to each other. For device disclosed in the embodiment, because it corresponds to the method disclosed in the embodiment, it is described simply, and the related part may refer to description of the method.

Those skilled in the art may be aware of that modules and steps provided in each embodiment disclosed in this specification can be implemented by electronic hardware, computer software or combination thereof. To describe the interchangeability between hardware and software clearly, components and steps of each embodiment are already described in the foregoing description according to the function commonalities. Whether these functions are executed by hardware or software depends on specific applications and design constraints of the technical solutions. Those skilled in the art can implement the described functions of each specific application by using different methods. However, such implementation should not be considered as going beyond the scope of the present invention.

The method or algorithm provided in the embodiments of the present invention may directly use a software module executed by hardware or a processor or combination thereof. The software module may reside in a random access memory (RAM), a memory, a read-only memory (ROM), an electrically programmable ROM, an electrically erasable programmable ROM, a register, a hard disk, a mobile disk, a CD-ROM, or any other form of storage medium well known in the art.

The method, apparatus, device, system and computer-readable storage medium for capturing a trace of an NVME hard disc provided by the invention are described in detail. Specific examples are described to explain the principle and implementation mode of the invention, and the description of the above examples is only used to help understand the method and core idea of the invention. It should be noted that for those skilled in the art various improvements and modifications can be made to the embodiments without departing from the idea or scope of the present invention, which also fall within the protection scope of the claims of the invention.

The following series of paragraphs is presented without limitation to describe additional aspects and features of the disclosure:

A0. A system for capturing a trace of a Non-Volatile Memory Express (NVME) hard disc is provided. The system comprising: a Baseboard Management Controller (BMC); a Basic Input Output System (BIOS); a fixture plate; and a protocol analysis instrument, wherein the BMC is connected with the fixture plate and the BIOS, respectively, and the fixture plate is connected with the protocol analysis instrument; wherein the BIOS is configured to acquire register error information of a peripheral component interconnect express (PCIe) link in which the NVME hard disc is located, and send the register error information to the BMC when an error occurs in the PCIe link; and the BMC is configured to send the register error information to the fixture plate; and wherein the fixture plate comprises a processor and a dial switch, and is configured to trigger the protocol analysis instrument to capture a PCIe trace of the NVME hard disc when a current error type corresponding to the dial switch is consistent with an error type of the register error information parsed by the processor.

A1. The system according to paragraph A0, wherein the fixture plate further comprises a Basic Input Output System (GPIO) pin, and the BPIO pin is connected with a trigger connector of the protocol analysis instrument, and the GPIO pin of the fixture plate is set to trigger the protocol analysis instrument to capture the PCIe trace of the NVME hard disc in response to that the current error type corresponding to the dial switch is consistent with the error type of the register error information parsed by the processor.

A2. The system according to paragraph A1, wherein a RS-232 serial port of the BMC on a server mainboard is connected to an input of the fixture plate through a cable, and the fixture plate is connected with the protocol analysis instrument through a coaxial cable.

A3. The system according to paragraph A2, wherein the BIOS is configured to send the register error information to the BMC via a KCS link.

A4. The system according to paragraph A0, wherein the current error type corresponding to the dial switch is an error type selected by a user.

A5. The system according to paragraph A0, wherein the current error type corresponding to the dial switch includes one or more error types selected by a user.

A5. The system according to paragraph A0, wherein the processor is further configured to receive the register error information from the BMC and parse address information carried by the register error information to determine whether the error type is consistent with the current error type corresponding to the dial switch, wherein the address information is a self-defined address and uniquely corresponds to the error type.

B0. A method for capturing a trace of a Non-Volatile Memory Express (NVME) hard disc, wherein the method is applied to a fixture plate including a processor and a dial switch. The method comprising acquiring register error information, wherein the register error information is register information collected by a Basic Input Output System (BIOS) when an error occurs in a peripheral component interconnect express (PCIe) link in which the NVME hard disc is located; parsing address information carried by the register error information to obtain a corresponding error type; determining whether the error type is consistent with a current error type corresponding to a dial switch; triggering a protocol analysis instrument to capture the PCIe trace of the NVME hard disc if the error type is consistent with the current error type corresponding to the dial switch; and wherein the fixture plate is connected with the protocol analysis instrument, and the BIOS sends the register error information to the fixture plate through a Baseboard Management Controller (BMC), and the address information of the register error information has a corresponding relationship with the error type.

B1. The method according to paragraph B0, wherein a Basic Input Output System (GPIO) pin of the fixture plate is connected with a trigger connector of the protocol analysis instrument, and triggering the protocol analysis instrument to capture the PCIe trace of the NVME hard disc comprises: sending instructions to set the GPIO pin of the fixture plate so as to trigger the protocol analysis instrument to capture the PCIe trace of the NVME hard disc.

B2. The method according to paragraph B1, wherein the BIOS sends the register error information to the BMC via a KCS link, and the BMC sends received register error information to the fixture plate through an RS-232 serial port.

B3. The method according to paragraph B0, wherein the current error type corresponding to the dial switch is an error type selected by a user.

B4. The method according to paragraph B0, wherein the address information is a self-defined address.

C0. An apparatus for capturing a trace of an NVME hard disc, wherein the apparatus is applied to a fixture plate and comprises: an information acquiring module configured to acquire register error information, wherein the register error information is register information collected by a BIOS when an error occurs in a PCIe link in which the NVME hard disc is located; the register error information is sent to the fixture plate by the BIOS via a BMC; and the fixture plate is connected with a protocol analysis instrument; an error type parsing module for parsing address information carried by the register error information to obtain a corresponding error type; wherein the address information of the register error information has a corresponding relationship with the error type; an error type matching result judging module for judging whether the error type is consistent with the current error type corresponding to the dial switch; and a triggering module for triggering a protocol analysis instrument to capture a PCIe trace of the NVME hard disc when the error type is consistent with the current error type corresponding to the dial switch.

D0. A device for capturing a trace of an NVME hard disc comprising a processor, wherein the processor is used to perform the following steps when the processor executes computer programs stored in a memory: acquiring register error information, wherein the register error information is register information collected by a Basic Input Output System (BIOS) when an error occurs in a PCIe link in which the NVME hard disc is located; parsing address information carried by the register error information to obtain an error type; determining whether the error type is consistent with a current error type corresponding to a dial switch of a fixture plate; triggering a protocol analysis instrument to capture a PCIe trace of the NVME hard disc if the error type is consistent with the current error type corresponding to the dial switch in the fixture plate.

D1. The device according to paragraph D0, wherein the current error type corresponding to the dial switch is an error type selected by a user.

D2. The device according to paragraph D0, wherein the address information is a self-defined address.

E0. A computer-readable storage medium comprising programs for capturing a trace of an NVME hard disc, wherein the programs when executed by a processor causes the processor to perform the steps of the method for capturing a trace of an NVME hard disc according to any one of Paragraphs B0 to B4.

The invention claimed is:

1. A system for capturing a trace of a Non-Volatile Memory Express (NVME) hard disc, the system comprising:
   a Baseboard Management Controller (BMC);
   a Basic Input Output System (BIOS);
   a fixture plate; and
   a protocol analysis instrument, wherein the BMC is connected with the fixture plate and the BIOS, respectively, and the fixture plate is connected with the protocol analysis instrument;
   wherein the BIOS is configured to acquire register error information of a peripheral component interconnect express (PCIe) link in which the NVME hard disc is located, and send the register error information to the BMC when an error occurs in the PCIe link; and the BMC is configured to send the register error information to the fixture plate; and
   wherein the fixture plate comprises a processor and a dial switch, and is configured to trigger the protocol analysis instrument to capture a PCIe trace of the NVME hard disc when a current error type corresponding to the dial switch is consistent with an error type of the register error information parsed by the processor.

2. The system of claim 1, wherein a Basic Input Output System (GPIO) pin of the fixture plate is connected with a trigger connector of the protocol analysis instrument, and the GPIO pin of the fixture plate is set to trigger the protocol analysis instrument to capture the PCIe trace of the NVME hard disc in response to that the current error type corresponding to the dial switch is consistent with the error type of the register error information parsed by the processor.

3. The system of claim 2, wherein a RS-232 serial port of the BMC on a server mainboard is connected to an input of the fixture plate through a cable, and the fixture plate is connected with the protocol analysis instrument through a coaxial cable.

4. The system of claim 3, wherein the BIOS is configured to send the register error information to the BMC via a KCS link.

5. The system of claim 1, wherein the current error type corresponding to the dial switch is an error type selected by a user.

6. The system of claim 1, wherein the current error type corresponding to the dial switch includes one or more error types selected by a user.

7. The system of claim 1, wherein the processor is further configured to receive the register error information from the BMC and parse address information carried by the register error information to determine whether the error type is consistent with the current error type corresponding to the dial switch, wherein the address information is a self-defined address and uniquely corresponds to the error type.

8. A method for capturing a trace of a Non-Volatile Memory Express (NVME) hard disc, wherein the method is applied to a fixture plate including a processor and a dial switch, the method comprising:
   acquiring register error information, wherein the register error information is register information collected by a Basic Input Output System (BIOS) when an error occurs in a peripheral component interconnect express (PCIe) link in which the NVME hard disc is located;
   parsing address information carried by the register error information to obtain a corresponding error type;
   determining whether the error type is consistent with a current error type corresponding to the dial switch;
   triggering a protocol analysis instrument to capture the PCIe trace of the NVME hard disc if the error type is consistent with the current error type corresponding to the dial switch;
   wherein the fixture plate is connected with the protocol analysis instrument, and the BIOS sends the register error information to the fixture plate through a Baseboard Management Controller (BMC), and the address information of the register error information has a corresponding relationship with the error type.

9. The method of claim 5, wherein a Basic Input Output System (GPIO) pin of the fixture plate is connected with a trigger connector of the protocol analysis instrument, and triggering the protocol analysis instrument to capture the PCIe trace of the NVME hard disc comprises:
   sending instructions to set the GPIO pin of the fixture plate so as to trigger the protocol analysis instrument to capture the PCIe trace of the NVME hard disc.

10. The method of claim 6, wherein the BIOS sends the register error information to the BMC via a KCS link, and the BMC sends received register error information to the fixture plate through an RS-232 serial port.

11. The method of claim 8, wherein the current error type corresponding to the dial switch is an error type selected by a user.

12. The method of claim 8, wherein the address information is a self-defined address.

13. A device for capturing a trace of an NVME hard disc comprising a processor, wherein the processor is used to perform the following steps when the processor executes computer programs stored in a memory:
   acquiring register error information, wherein the register error information is register information collected by a Basic Input Output System (BIOS) when an error occurs in a PCIe link in which the NVME hard disc is located;
   parsing address information carried by the register error information to obtain an error type;
   determining whether the error type is consistent with a current error type corresponding to a dial switch of a fixture plate;
   triggering a protocol analysis instrument to capture a PCIe trace of the NVME hard disc if the error type is consistent with the current error type corresponding to the dial switch in the fixture plate.

* * * * *

UNITED STATES PATENT AND TRADEMARK OFFICE
CERTIFICATE OF CORRECTION

PATENT NO. : 11,442,831 B2
APPLICATION NO. : 17/275827
DATED : September 13, 2022
INVENTOR(S) : Yixin Sun It is certified that error appears in the above-identified patent and that said Letters Patent is hereby corrected as shown below:

In the Claims

Column 12, Line 21: the preamble of Claim 9 should read --9. The method of claim 8,--

Column 12, Line 29: the preamble of Claim 10 should read --10. The method of claim 9,--

Signed and Sealed this
Thirteenth Day of December, 2022

Katherine Kelly Vidal
*Director of the United States Patent and Trademark Office*